Jan. 13, 1925.

C. A. WITTER

VEHICLE WHEEL

Filed Feb. 16, 1923

1,522,663

2 Sheets-Sheet 1

Witnesses
Charles H. Buckler
George A. Gruss

INVENTOR
Claude A. Witter
BY Joshua R. H. Potts
His ATTORNEY

Jan. 13, 1925.                                                    1,522,663
C. A. WITTER
VEHICLE WHEEL
Filed Feb. 16, 1923                  2 Sheets-Sheet 2

Witnesses
Charles H. Buckler
George A. Gruss

INVENTOR
Claude A. Witter
BY Joshua R. H. Potts
His ATTORNEY

Patented Jan. 13, 1925.

1,522,663

UNITED STATES PATENT OFFICE.

CLAUDE A. WITTER, OF PHILADELPHIA, PENNSYLVANIA, ASSIGNOR TO HALL WHEEL CORPORATION, OF PHILADELPHIA, PENNSYLVANIA.

VEHICLE WHEEL.

Application filed February 16, 1923. Serial No. 619,396.

*To all whom it may concern:*

Be it known that I, CLAUDE A. WITTER, a citizen of the United States, residing at Philadelphia, in the county of Philadelphia and State of Pennsylvania, have invented certain new and useful Improvements in Vehicle Wheels, of which the following is a specification.

My invention relates more especially to disk wheels of the general type used on motor vehicles and the object of my invention is to provide a simple and durable wheel of comparatively light construction which will be sufficiently rigid and yet resilient and which will absorb short vibrations and be noiseless when in use.

This object, and other advantageous ends which will be described hereinafter, I attain in the following manner, reference being had to the accompanying drawings in which—

Figure 1:
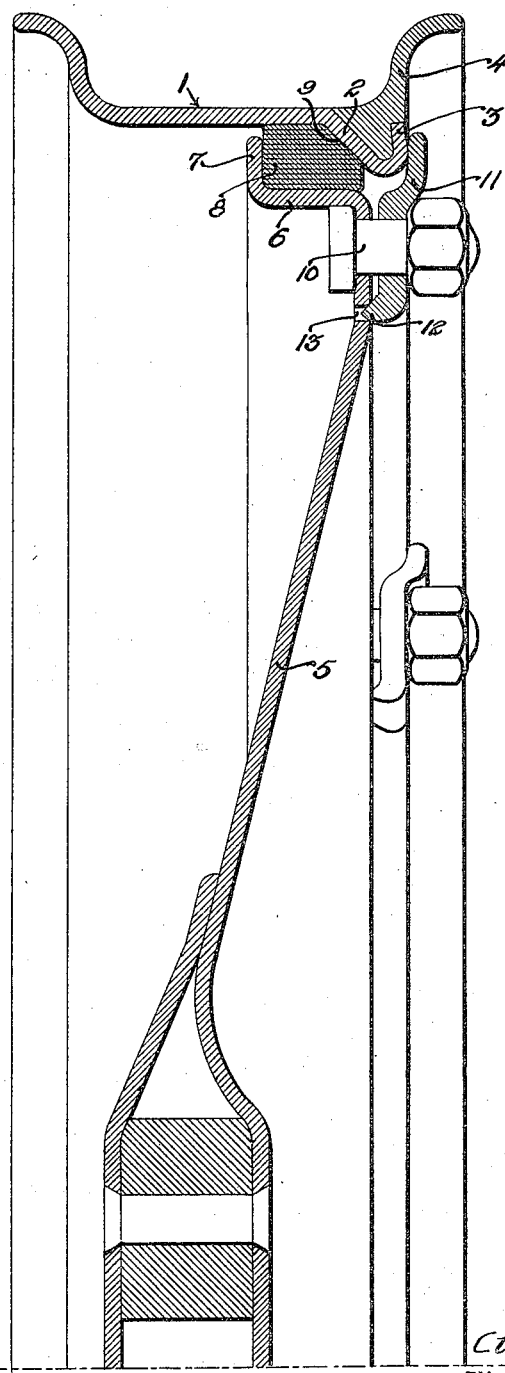
Figure 2:
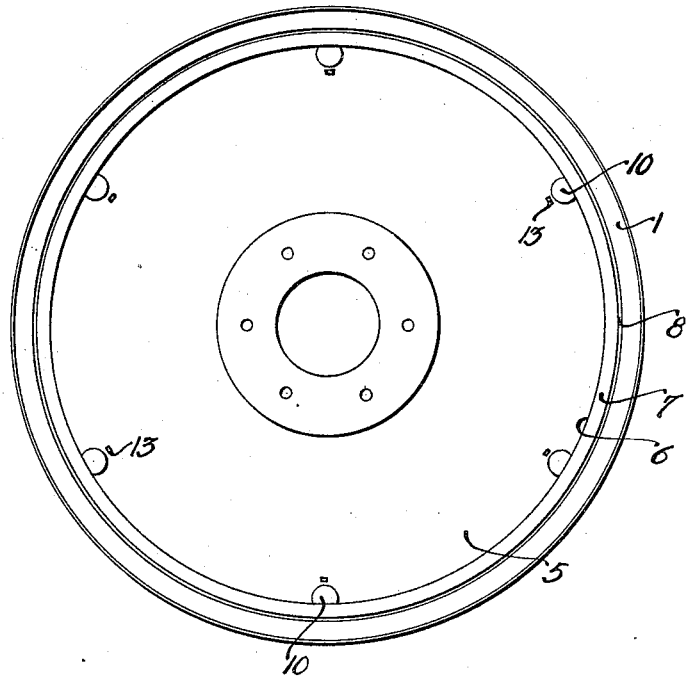

Figure 1 is a partial cross section of a wheel embodying my invention,

Figure 2 a side elevation of a wheel made in accordance with my invention, and

Figure 3:
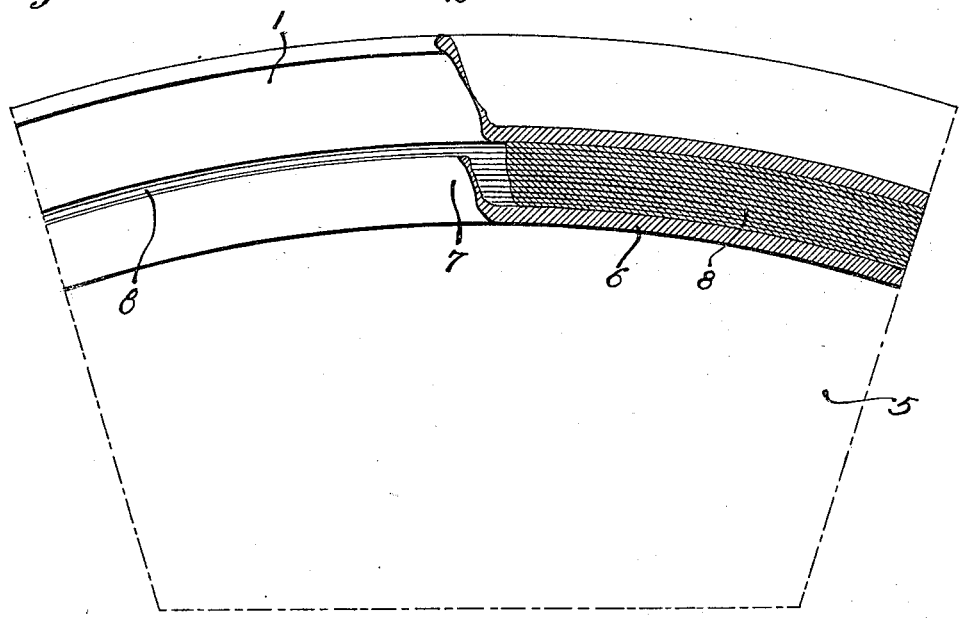

Figure 3 a fragmentary view of the wheel partly in side elevation and partly in circumferential section.

In the drawings the numeral 1 indicates a rim section of an automobile wheel provided with an inwardly extending sloping wall 2 merging into an outwardly extending wall 3 and forming a peripheral channel adapted to receive a spring ring 4. A metallic disk 5 extends from the hub to a line adjacent but spaced from the inner peripheral line of the rim and is provided with an annular flange 6 extending at substantially right angles to the radius of the wheel and merging into a flange 7 perpendicular thereto, the periphery of which is spaced from the rim. A band 8 of resilient material embraces flange 6 and is preferably provided with a beveled edge 9 adapted to engage the sloping wall 2 on rim section 1 and is held against peripheral movement in the other direction by perpendicular flange 7. The disk is provided near its periphery with a series of apertures adapted to receive bolts 10 which take through apertures in clamping members 11 adapted to engage the rim wall 3 and the disk. The clamping members are preferably provided with teeth 12 adapted to engage with notches or apertures 13 in the disk and hold the clamping member against rotary motion relatively to the disk.

I prefer to construct the resilient member as a laminated structure of rubberized fabric vulcanized in band shape but any material may be used which combines the needed resiliency and resisting capacity.

My invention interposes the resilient member in such manner that vibration from the road is not transmitted directly to the disk structure but is absorbed by the resilient member and a noiseless wheel is produced.

For use, the resilient member is placed on the flange of the disk with its beveled edge abutting the sloping wall of the rim, the spring ring positioned, and clamping members bolted in place with their teeth in engagement with the apertures in the disk. By tightening the bolts the resilient band is compressed into binding engagement with the rim.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A wheel including a hub and a rim; a disk, extending from the hub, having an annular flange extending at substantially right angles to the radius of the wheel and a flange perpendicular thereto, the flanges being spaced from the rim; a resilient band interposed between the flanges and the rim, and means for clamping the resilient member into binding engagement with the flanges and the rim.

2. A wheel including a hub; a rim having an inwardly sloping member; a disk, extending from the hub, having an annular flange extending at substantially right angles to the radius of the wheel and a flange perpendicular thereto, the flanges being spaced from the rim; a non-metallic resilient band, interposed between the flanges and the rim, having a beveled edge adapted to engage the sloping member on the rim, and means for clamping the resilient member into binding engagement with the flanges and the rim.

3. A wheel including a hub and a rim; a disk, extending from the hub, having an annular flange extending at substantially right angles to the radius of the wheel and a flange perpendicular thereto, the flanges being spaced from the rim; a resilient band interposed between the flanges and the rim; clamping members engaging the disk and a wall of the rim, and means for exerting pressure upon the clamping members and disk to force the resilient member into binding engagement with the rim and flanges.

In testimony whereof I have signed my name to this specification in the presence of two subscribing witnesses.

CLAUDE A. WITTER.

Witnesses:
 Jos. B. Katz,
 Chas. E. Potts.